(12) United States Patent
Hasbrook et al.

(10) Patent No.: US 9,393,898 B2
(45) Date of Patent: Jul. 19, 2016

(54) ELECTRICAL AND PHYSICAL MOUNTING ASSEMBLIES

(71) Applicants: X3, LLC, Lake Oswego, OR (US);
Samson Sports, LLC, Camas, WA (US)

(72) Inventors: William B. Hasbrook, Tualatin, OR (US); Brian T. Kelsey, Portland, OR (US); Scott D. Parnell, Camas, WA (US)

(73) Assignees: Samson Sports, LLC, Camas, WA (US); X3, LLC, Lake Oswego, OR (US)

( * ) Notice: Subject to any disclaimer, the term of this patent is extended or adjusted under 35 U.S.C. 154(b) by 0 days.

(21) Appl. No.: 14/621,079

(22) Filed: Feb. 12, 2015

(65) Prior Publication Data

US 2015/0224914 A1    Aug. 13, 2015

Related U.S. Application Data

(60) Provisional application No. 61/939,169, filed on Feb. 12, 2014, provisional application No. 62/115,076, filed on Feb. 11, 2015.

(51) Int. Cl.

| | |
|---|---|
| *B60Q 1/00* | (2006.01) |
| *F21V 33/00* | (2006.01) |
| *H01R 35/04* | (2006.01) |
| *B60Q 1/04* | (2006.01) |
| *H04R 1/02* | (2006.01) |
| *F21V 21/002* | (2006.01) |
| *F21Y 101/02* | (2006.01) |
| *F21Y 113/00* | (2016.01) |
| *H04R 1/40* | (2006.01) |

(52) U.S. Cl.
CPC ............ *B60Q 1/0088* (2013.01); *B60Q 1/0017* (2013.01); *B60Q 1/0483* (2013.01); *F21V 33/0056* (2013.01); *H01R 35/04* (2013.01); *H04R 1/026* (2013.01); *F21V 21/002* (2013.01); *F21Y 2101/02* (2013.01); *F21Y 2113/005* (2013.01); *H04R 1/403* (2013.01)

(58) Field of Classification Search
CPC .. B60Q 1/0088; B60Q 1/0017; B60Q 1/0483; F21V 33/0056; H01R 35/04; H04R 1/026
See application file for complete search history.

(56) References Cited

U.S. PATENT DOCUMENTS

| | | | | |
|---|---|---|---|---|
| 4,875,143 | A | * | 10/1989 | Fernandez ............... B60Q 1/26 362/234 |
| 5,772,307 | A | * | 6/1998 | Philyaw .............. F21V 33/0056 362/253 |
| 5,937,073 | A | | 8/1999 | Van Gieson |

(Continued)

*Primary Examiner* — Mary Ellen Bowman
(74) *Attorney, Agent, or Firm* — Dascenzo Intellectual Property Law, P.C.

(57) ABSTRACT

Electrical and physical mounting assemblies. The mounting assemblies include a male structure, a female structure, a retention structure, and a rotation control structure. The male structure has an outer surface and includes at least a first electrical contact that defines a portion of the outer surface. The female structure defines a receptacle that is sized to receive the male structure. The receptacle and the male structure are shaped to permit relative rotation therebetween about a rotational axis when the male structure is received within the receptacle. The female structure includes a second electrical contact that defines a portion of the receptacle. The first electrical contact and the second electrical contact are shaped to maintain electrical communication therebetween during the relative rotation. The retention structure is configured to selectively retain the male structure within the receptacle. The rotation control structure is configured to selectively restrict the relative rotation.

20 Claims, 8 Drawing Sheets

(56) References Cited

U.S. PATENT DOCUMENTS

| | | | |
|---|---|---|---|
| 6,374,942 B1 * | 4/2002 | Huggins | H04R 1/025 181/150 |
| 6,798,892 B2 | 9/2004 | Parnell | |
| 8,568,162 B1 | 10/2013 | White et al. | |
| 2008/0225510 A1 * | 9/2008 | Rocha | F21V 33/0056 362/86 |

* cited by examiner

ELECTRICAL AND PHYSICAL MOUNTING ASSEMBLIES

RELATED APPLICATIONS

This application claims priority to U.S. Provisional Patent Application No. 61/939,169, which was filed on Feb. 12, 2014, and U.S. Provisional Patent Application No. 62/115,076, which was filed on Feb. 11, 2015, the complete disclosures of which are hereby incorporated by reference.

FIELD OF THE DISCLOSURE

The present disclosure is directed generally to electrical and physical mounting assemblies for electrical devices, and more particularly to electrical and physical mounting assemblies that are configured to operably mount an electrical device to a base structure, to conduct an electric current between the electrical device and the base structure, and to facilitate both rotation of the electrical device relative to the base structure and selective separation of the electrical device from the base structure.

BACKGROUND OF THE DISCLOSURE

An electrical device may be mounted, attached, and/or affixed to a variety of different base structures. As examples, electrical devices, such as speakers, lights, and/or a combination thereof, may be mounted on various vehicles, such as boats, off-road vehicles, and/or other land and/or marine vehicles. Generally, mounting the electrical device on the base structure includes both physically affixing the electrical device to the base structure and providing for a flow of electric current between the electrical device and the base structure, such as to power the electrical device. Traditionally, a mounting assembly is utilized to physically affix the electrical device to the base structure, while one or more elongate wires are utilized to permit the flow of electric current between the electrical device and the base structure.

It may be desirable to provide adjustment of a relative orientation between the electrical device and the base structure. As an example, and when the electrical device includes a speaker, it may be desirable to direct sound that is produced by the speaker in a certain direction through rotation of the speaker relative to the base structure. As another example, and when the electrical device includes a light, it may be desirable to direct the light in a certain direction through rotation of the light relative to the base structure.

Such rotation may be difficult, time-consuming, or even impossible with traditional mounting assemblies. As an example, the traditional mounting assembly may not be configured for convenient and/or tool-free adjustment of the relative orientation. As another example, the presence of the one or more elongate wires may restrict, or even preclude, the adjustment of the relative orientation.

It also may be desirable to selectively and/or physically separate the electrical device from the base structure without requiring significant time, effort, and/or the use of tools. As an example, the base structure may be stored in an insecure location (such as when a boat is stored in a marina and/or when an off-road vehicle is stored in a yard or parking space), and it may be desirable to remove the electrical device from the base structure during storage of the base structure. The desire for easy selective removal may be due to the expense of the electrical device (and thus risk of theft thereof) and/or a desire to stow the electrical device apart from its "use" position. As additional examples, the electrical device may be removed from the base structure to permit repair and/or maintenance of the electrical device and/or to replace the electrical device with another (similar or different) electrical device.

Such separation and/or removal of the electrical device from the base structure may be difficult and/or unsightly with traditional mounting assemblies. As an example, the traditional mounting assembly may not be configured for convenient and/or tool-free separation of the electrical device from the base structure, as discussed. As another example, removal of the electrical device from the base structure may leave unsightly wires visible to passers-by, thereby detracting from the aesthetic appeal of the base structure and leaving the wires exposed and susceptible to damage. Thus, there exists a need for improved electrical and physical mounting assemblies.

SUMMARY OF THE DISCLOSURE

Electrical and physical mounting assemblies are disclosed herein. The mounting assemblies include a male structure, a female structure, a retention structure, and a rotation control structure. The male structure has an outer surface and includes at least a first electrical contact that defines a portion of the outer surface. The female structure defines a receptacle that is sized to receive the male structure. The receptacle and the male structure are shaped to permit relative rotation therebetween about a rotational axis when the male structure is received within the receptacle. The female structure includes a second electrical contact that defines a portion of the receptacle. The first electrical contact and the second electrical contact are shaped to maintain electrical communication therebetween during the relative rotation. The retention structure is configured to selectively retain the male structure within the receptacle. The rotation control structure is configured to selectively restrict the relative rotation.

In some embodiments, the male structure includes a plurality of first electrical contacts that includes at least a first speaker power contact, a first light power contact, and a first ground contact. In some embodiments, the female structure includes a plurality of second electrical contacts that includes at least a second speaker power contact, a second light power contact, and a second ground contact.

In some embodiments, the retention structure is configured to permit the relative rotation while the male structure is retained within the receptacle. In some embodiments, the retention structure defines at least a retaining configuration, in which the retention structure retains the male structure within the receptacle, and a released configuration, in which the retention structure does not retain the male structure within the receptacle. In some embodiments, the male structure further defines a retention recess sized to receive at least a portion of the retention structure. In some embodiments, the retention structure includes a plunger that is configured to be received within the retention recess when the retention structure is in the retaining configuration.

In some embodiments, the rotation control structure defines at least a restricting configuration, in which the rotation control structure restricts the relative rotation of the male structure within the receptacle, and a permitting configuration, in which the rotation control structure permits the relative rotation of the male structure within the receptacle. In some embodiments, the male structure defines a clamping surface that defines at least a portion of the outer surface. In some embodiments, the rotation control structure is configured to operatively engage the clamping surface when the rotation control structure is in the restricting configuration.

In some embodiments, the electrical and physical mounting assembly may be configured to operatively mount an electrical device, such as a lighted speaker, to a base structure, such as a vehicle. In such embodiments, the electrical and physical mounting assemblies may be configured to conduct a plurality of electric currents between the lighted speaker and the vehicle. In these embodiments, the plurality of electric currents includes at least a speaker power electric current and a light power electric current.

DETAILED DESCRIPTION AND BEST MODE OF THE DISCLOSURE

Figure 1:
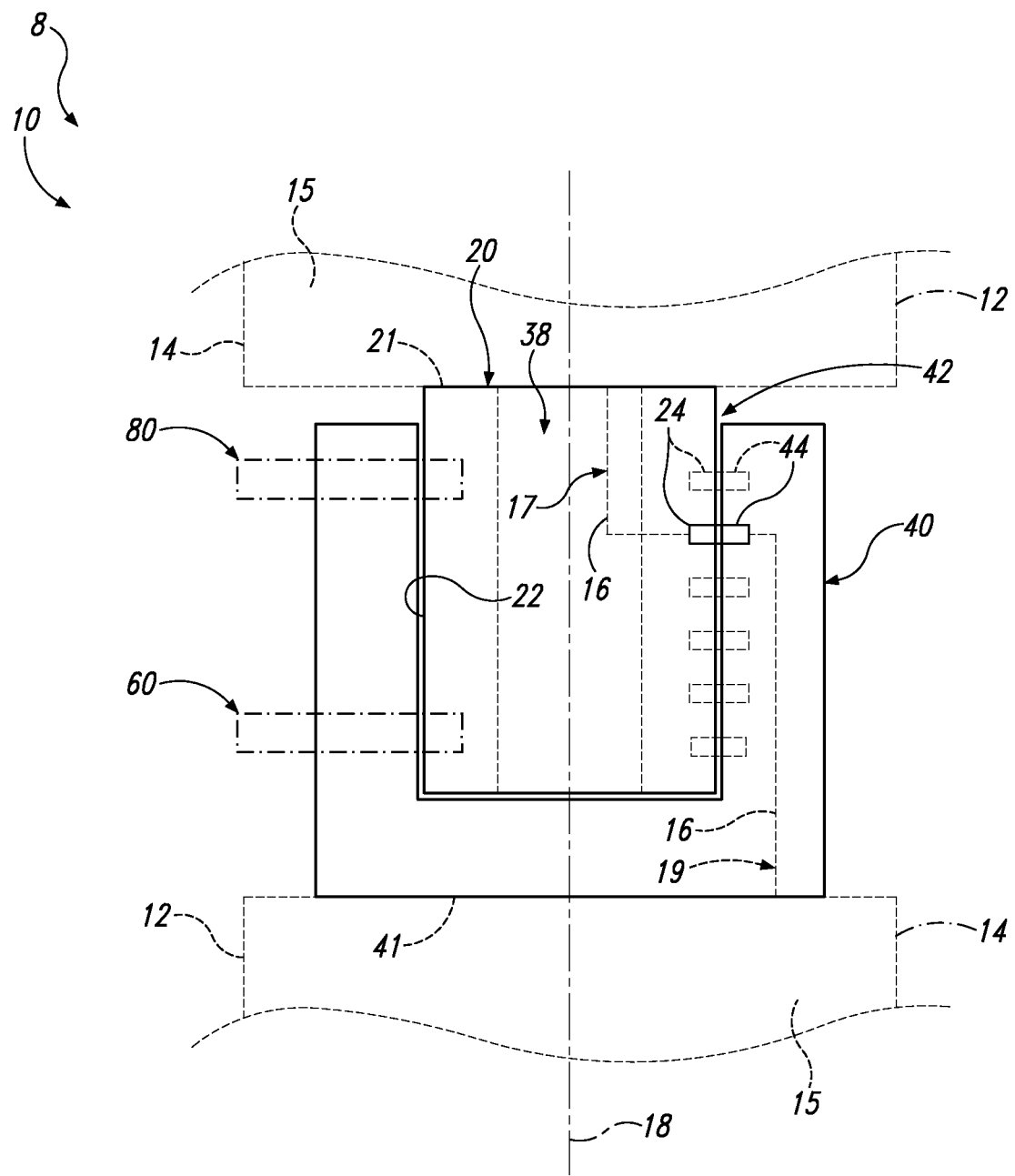
FIG. 1 is a schematic representation of examples of an electrical and physical mounting assembly according to the present disclosure.

FIGS. 1-10 provide examples of electrical and physical mounting assemblies 10 according to the present disclosure, of components of electrical and physical mounting assemblies 10, and/or of electrical assemblies 8 that include and/or utilize electrical and physical mounting assemblies 10. Elements that serve a similar, or at least substantially similar, purpose are labeled with like numbers in each of FIGS. 1-10, and these elements may not be discussed in detail herein with reference to each of FIGS. 1-10. Similarly, all elements may not be labeled in each of FIGS. 1-10, but reference numerals associated therewith may be utilized herein for consistency. Elements, components, and/or features that are discussed herein with reference to one or more of FIGS. 1-10 may be included in and/or utilized with any of FIGS. 1-10 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a given embodiment without departing from the scope of the present disclosure.

FIG. 1 is a schematic representation of examples of an electrical and physical mounting assembly 10 according to the present disclosure. Electrical and physical mounting assembly 10 also may be referred to herein as a mounting assembly 10 and/or simply as an assembly 10. Electrical and physical mounting assembly 10 may form a portion of an electrical assembly 8 that further includes an electrical device 12 and/or a base structure 14.

As illustrated in dashed lines in FIG. 1, mounting assembly 10 may be utilized to operatively mount a first structure, such as electrical device 12, to a second structure, such as base structure 14. In addition, mounting assembly 10 also may be configured to conduct one or more electric currents 16 between the electrical device and the base structure, such as via electrical conductors 17 and 19. Electrical conductors 17 may extend within a male structure 20, such as via a central recess 38 that extends through the male structure. In addition, electrical conductors 19 may extend within a female structure 40 that may be configured to receive male structure 20.

Mounting assembly 10 further may be adapted, configured, designed, and/or constructed to permit electrical device 12 and base structure 14 to rotate relative to one another (such as about a rotational axis 18). Mounting assembly 10 also may be configured to permit selective, simple, rapid, and/or tool-free separation of electrical device 12 from base structure 14, and selective recoupling thereto. Mounting assembly 10 may be configured to permit electrical device 12 to be separated from base structure 14 without exposing electrical conductors 17 and 19 that conduct electric current 16 (or while retaining electrical conductors 17 and 19 internal to male structure 20 and female structure 40, respectively).

Female structure 40 defines a receptacle 42 that is sized to receive male structure 20. Accordingly, male structure 20 has an outer surface 22 that is sized to be received within receptacle 42. Male structure 20 and receptacle 42 of female structure 40 are adapted, configured, sized, designed, and/or shaped such that the male structure and the female structure may rotate relative to one another (such as about rotational axis 18) when the male structure is received within the receptacle, thereby permitting relative rotation between electrical device 12 and base structure 14, as discussed. As illustrated in FIG. 1 using dashed and dash-dot lines, male structure 20 may be operatively attached to and/or may form a portion of one of electrical device 12 and base structure 14, with female structure 40 being operatively attached to and/or forming a portion of the other of electrical device 12 and base structure 14.

Mounting assembly 10 also includes a retention structure 60. The retention structure is adapted, designed, sized, located, and/or configured to selectively retain male structure 20 within receptacle 42. Retention structure 60 also permits the relative rotation between male structure 20 and female structure 40 while the retention structure is retaining the male structure within the receptacle. Thus, retention structure 60 may permit rotation of male structure 20 and female structure 40 about rotational axis 18 while selectively restricting, limiting, and/or resisting translation of male structure 20 and female structure 40 relative to one another along rotational axis 18.

Mounting assembly 10 further includes a rotation control structure 80. Rotation control structure 80 may be separate and/or spaced apart from retention structure 60 and may be adapted, designed, sized, located, and/or configured to selectively resist the relative rotation between male structure 20 and female structure 40 when the male structure is received within receptacle 42.

As illustrated in FIG. 1, male structure 20 includes a first electrical contact 24 that defines at least a portion of outer surface 22. In addition, female structure 40 includes a second electrical contact 44 that defines at least a portion of receptacle 42. First electrical contact 24 and second electrical contact 44 may be adapted, configured, designed, sized, and/or shaped to maintain electrical communication therebetween when male structure 20 is received within receptacle 42, when retention structure 60 retains male structure 20 within receptacle 42, and/or when the male structure and the female structure are rotated relative to one another about rotational axis 18. It is within the scope of the present disclosure that first electrical contact 24 and second electrical contact 44 may maintain electrical communication (which also may be referred to as electrical contact) while male structure 20 and female structure 40 are rotated relative to one another by any suitable amount, or angle. As examples, the electrical communication may be maintained during relative rotation of at least 90 degrees, at least 180 degrees, at least 270 degrees, at least 360 degrees, or more than 360 degrees (i.e., more than one complete revolution of the male structure 20 with respect to the female structure 40). As another example, mounting assembly 10 may be constructed such that male structure 20 and female structure 40 may be rotated about rotational axis 18 by any suitable angle and/or over any suitable number of revolutions (or even an infinite number of revolutions) while maintaining the electrical communication between the first electrical contact and the second electrical contact. As yet another example, first electrical contact 24 and second electrical contact 44 may be configured to permit the rotation of male structure 20 and female structure 40 without twisting, winding, and/or otherwise bending electrical conductor 17 and/or electrical conductor 19.

As illustrated in dashed lines in FIG. 1, mounting assembly 10 may include a plurality of first electrical contacts 24 and a corresponding plurality of second electrical contacts 44. The plurality of first electrical contacts and the plurality of second electrical contacts may be arranged as opposed pairs, and each of the plurality of first electrical contacts may maintain electrical communication with a corresponding one of the plurality of second electrical contacts during relative rotation of male structure 20 and female structure 40 about rotational axis 18. The plurality of first electrical contacts and/or the plurality of second electrical contacts may include any suitable number of electrical contacts, including at least 2, at least 3, at least 4, at least 5, at least 6, at least 7, at least 8, at least 9, or at least 10 electrical contacts, and mounting assembly 10 also may include a corresponding number of electrical conductors 17 and 19.

Each opposed pair of electrical contacts may be configured to convey a respective electric current between the male structure and the female structure (and/or between electrical device 12 and base structure 14), such as via a corresponding plurality of respective electrical conductors 17 and 19. The respective electric currents may be different and/or discrete electric currents that may be generated separately within a power source 15 of base structure 14 and/or that may be utilized to power different portions, or components, of electrical device 12. Examples of power source 15 include any suitable battery, alternator, generator, and/or amplifier.

As a more specific example, mounting assembly 10 may be configured to operatively mount an electrical assembly, in the form of a lighted speaker that includes a light and a speaker, to a vehicle, such as a boat. Under these conditions, the plurality of first electrical contacts may include at least a first speaker power contacts, at least a first light power contact, and at least a first ground contact. Similarly, the plurality of second electrical contacts may include at least a second speaker power contact, at least a second light power contact, and at least a second ground contact.

The at least a first speaker power contact and the at least a second speaker power contact together may be configured to provide a speaker power electric current to the speaker, while the at least a first light power contact and the at least a second light power contact together may be configured to provide a light power electric current to the light. The at least a first ground contact and the at least a second ground contact together may be configured to receive the speaker power electric current from the speaker and to receive the light power electric current from the light.

The at least a first ground contact and the at least a second ground contact may include a single first ground contact and a single second ground contact that may act as a ground for both the speaker and the light. Alternatively, the at least a first ground contact may include a first speaker ground contact and a first light ground contact; and the at least a second ground contact may include a second speaker ground contact and a second light ground contact that is separate from the second speaker ground contact. The first speaker ground contact and the second speaker ground contact together may be configured to receive the speaker power electric current from the speaker. The first light ground contact and the second light ground contact together may be configured to receive the light power electric current from the light.

First electrical contact 24 and/or second electrical contact 44 may include and/or be any suitable structure. As an example, and as discussed in more detail herein, first electrical contact 24 may include and/or be an electrically conductive ring, which extends partially around, and optionally substantially or even completely around, an outer perimeter of outer surface 22 of male structure 20. Furthermore, in this example, second electrical contact 44 may include and/or be a spring-loaded contact, which is configured to extend between female structure 40 and male structure 20, to project into receptacle 42, and/or to extend into electrical communication with the electrically conductive ring. As another example, second electrical contact 44 may include and/or be an electrically conductive ring, which extends partially around, and optionally substantially or even completely around, an inner perimeter of receptacle 42 of female structure 40. Furthermore, in this example, first electrical contact 24 may include and/or be a spring-loaded contact, which is configured to extend between male structure 20 and female structure 40, to project from outer surface 22 of male structure 20, and/or to extend into electrical communication with the electrically conductive ring of second electrical contact 44.

Male structure 20 and/or receptacle 42 may include and/or define any suitable shape that may permit the relative rotation about rotational axis 18. Generally, a shape of receptacle 42 will correspond to and/or complement a shape of male structure 20, though this is not required. As an example, outer surface 22 of male structure 20 may define a cylindrical region. Under these conditions, receptacle 42 may define an at least partially cylindrical receptacle. When male structure 20 defines the cylindrical region, first electrical contact 24 may extend at least partially, or even completely, around a circumference of the cylindrical region and/or may extend in a plane that is at least substantially perpendicular to rotational axis 18. Similarly, and when receptacle 42 defines the at least partially cylindrical receptacle, second electrical contact 44 may extend at least partially, or even completely, around a circumference of the cylindrical receptacle and/or may extend in a plane that is at least substantially perpendicular to rotational axis 18.

Retention structure 60 may include and/or be any suitable structure that may be configured to selectively retain male structure 20 within receptacle 42. As an example, retention structure 60 may define a retaining configuration, in which the retention structure retains the male structure within the receptacle. As another example, retention structure 60 additionally or alternatively may define a released configuration, in which the retention structure does not retain the male structure within the receptacle and/or in which the retention structure permits removal of the male structure from the receptacle. More specific, but still non-exclusive, examples of retention structure 60 are discussed herein. Retention structure 60 is illustrated in dash-dot lines in FIG. 1 to indicate that the retention structure may be operatively attached to, may operatively engage, may directly operatively engage, and/or may form a portion of any suitable portion of mounting assembly 10, including male structure 20 and/or female structure 40, as discussed in more detail herein.

Rotation control structure 80 may include and/or be any suitable structure that may be configured to selectively restrict the relative rotation about rotational axis 18. As an example, rotation control structure 80 may define a restricting configuration, in which the rotation control structure restricts the relative rotation about rotational axis 18. The restricting configuration additionally or alternatively may be referred to as a fixed configuration, a secured configuration, and/or a clamped configuration. As another example, rotation control structure 80 additionally or alternatively may define a permitting configuration, in which the rotation control structure permits the relative rotation. The permitting configuration additionally or alternatively may be referred to as an adjustment configuration, a rotating configuration, and/or a positioning configuration. Similar to retention structure 60, rotation control structure 80 is illustrated in dash-dot lines in FIG. 1 to indicate that the rotation control structure may be operatively attached to, may operatively engage, may directly operatively engage, and/or may form a portion of any suitable portion of mounting assembly 10, including male structure 20 and/or female structure 40, as discussed in more detail herein.

As illustrated in dashed lines in FIG. 1, male structure 20 further may include and/or be operatively attached to a first mounting structure 21 that may be configured to operatively affix male structure 20 to electrical device 12 and/or to base structure 14. Similarly, and as also illustrated in dashed lines in FIG. 1, female structure 40 further may include and/or be operatively attached to a second mounting structure 41 that may be configured to operatively affix female structure 40 to electrical device 12 and/or to base structure 14. Examples of first mounting structure 21 and/or second mounting structure 41 include any suitable bolt, nut, clamp, and/or fixture.

Male structure 20 and female structure 40 together may be configured to provide mechanical support for electrical device 12 when the electrical device is operatively affixed to base structure 14 by mounting assembly 10. This mechanical support may be the only, or sole, mechanical support for electrical device 12, and male structure 20 and female structure 40 may be adapted, configured, sized, constructed, and/or shaped to provide mechanical support that is sufficient to retain electrical device 12 operatively affixed to base structure 14 despite motion and/or jarring of electrical assembly 8. As examples, the mechanical support may be sufficient to retain electrical device 12 operatively affixed to base structure 14 when base structure 14 is conveyed across the water (such as when the base structure is a watercraft), when base structure 14 is driven on a road (such as when the base structure is a vehicle), and/or when base structure 14 is driven off-road (such as when the base structure is an off-road vehicle).

Stated another way, mounting assembly 10 may not include any other, or additional, mechanical support structures and/or mechanisms that may be utilized to provide additional mechanical support for electrical device 12 and/or that may decrease forces that are applied to male structure 20 and/or to female structure 40 during motion and/or jarring of electrical assembly 8. As an example, male structure 20 may not be surrounded by an additional mechanical support structure and/or may not require an additional mechanical support structure to support the electrical device.

Electrical device 12 may include any suitable structure that may be operatively mounted by mounting assembly 10, may receive one or more electric currents 16 from mounting assembly 10, and/or may be operatively mounted to base structure 14 via mounting assembly 10. As examples, electrical device 12 may include and/or be any suitable type and/or number of speaker, light, LED light, multi-color LED light, spotlight, floodlight, and/or a speaker that includes one or more lights.

Base structure 14 may include any suitable structure that may support mounting assembly 10, that may be operatively attached to mounting assembly 10, that may be operatively mounted to electrical device 12 via mounting assembly 10, that may provide one or more electric currents 16 to electrical device 12 via mounting assembly 10, and/or that may include power source 15. As examples, base structure 14 may include and/or be a tower (such as a board and/or ski tower of a boat), a light bar, a speaker bar, a utility rack, a roll bar, and/or a boat rail. As additional examples, base structure 14 may be operatively attached to, may include, and/or may be a vehicle, such as a boat, a vessel, an automobile, an off-road vehicle, and/or an ATV.

FIGS. 2-10 provide less schematic examples of electrical and physical mounting assemblies 10 according to the present disclosure that may be included in and/or utilized with electrical assemblies 8. FIGS. 2-10 may present more specific and/or detailed views of mounting assembly 10 of FIG. 1, and any of the structures, features, components, and/or variations that are discussed herein with reference to any of FIGS. 2-10 may be included in and/or utilized with electrical assemblies 8 and/or mounting assemblies 10 of FIG. 1 without departing from the scope of the present disclosure. Similarly, any of the structures, features, components, and/or variations that are discussed herein with reference to FIG. 1 may be included in and/or utilized with electrical assemblies 8 and/or mounting assemblies 10 of FIGS. 2-10 without departing from the scope of the present disclosure.

Figure 2:
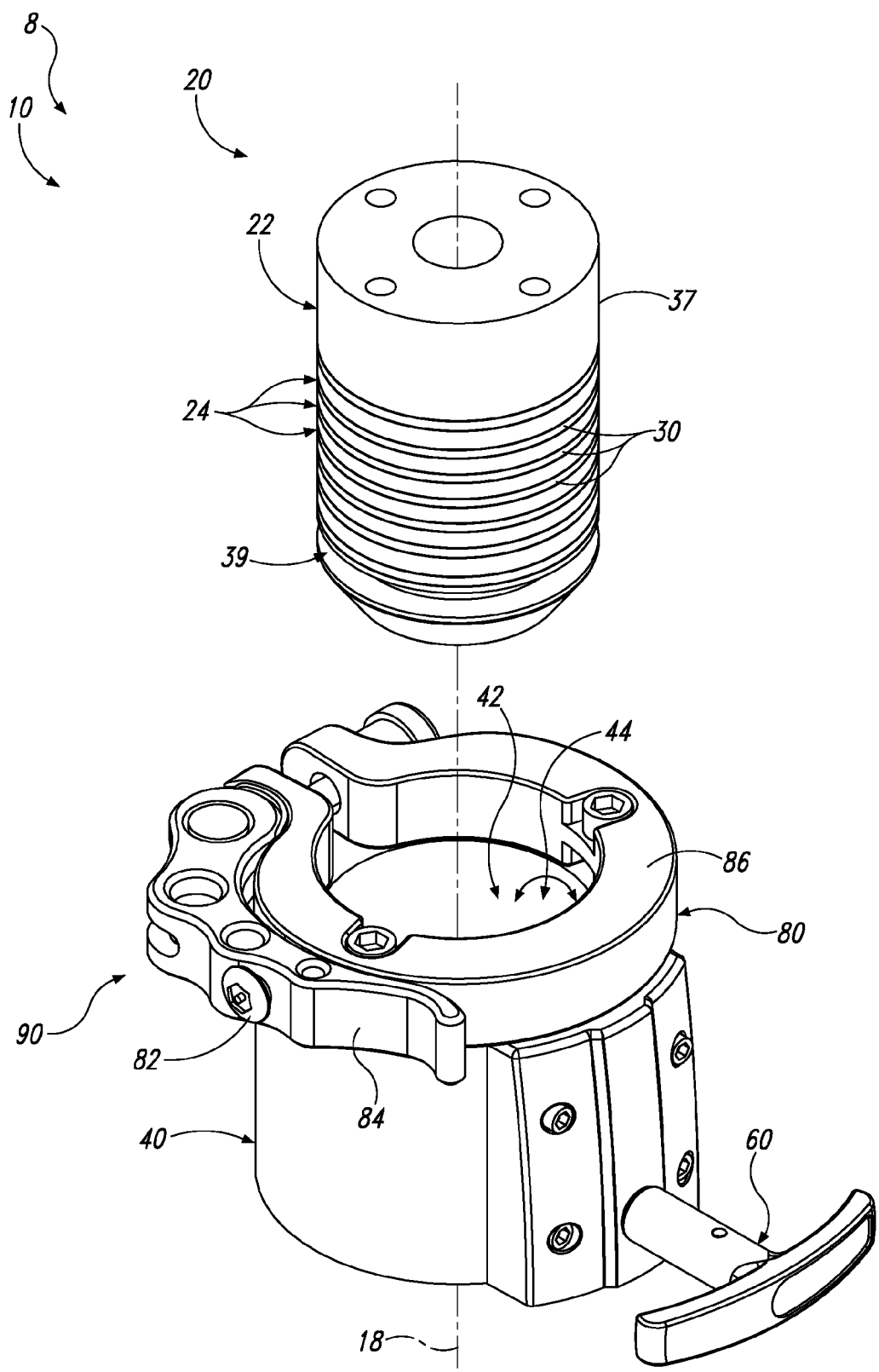
FIG. 2 is a less schematic, partially exploded view of an electrical and physical mounting assembly according to the present disclosure.
Figure 3:
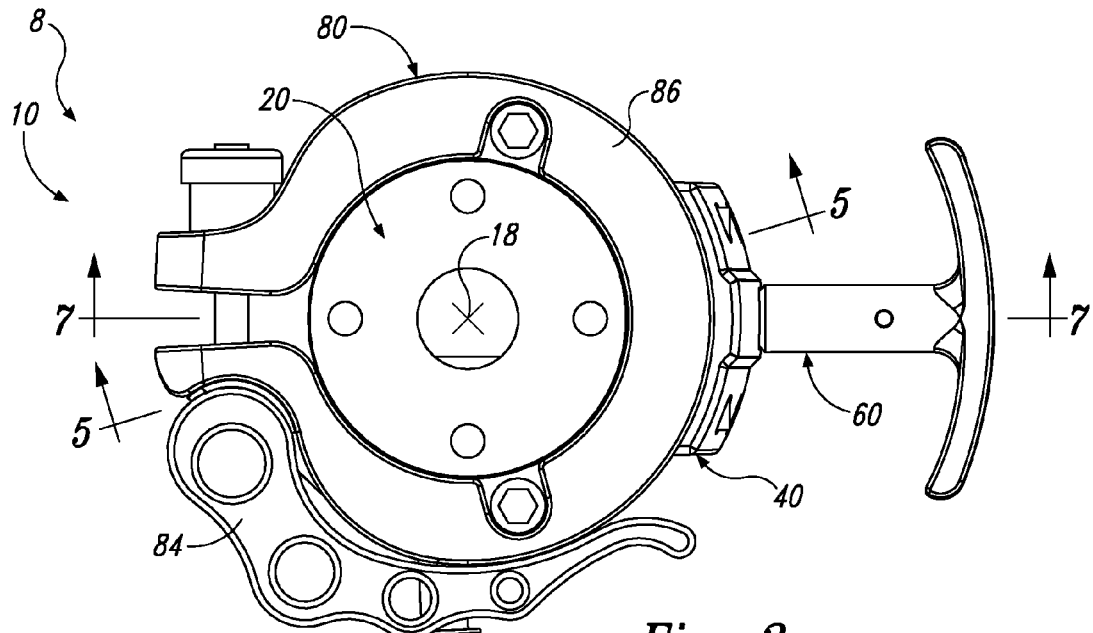
FIG. 3 is a top view of the electrical and physical mounting assembly of FIG. 2 illustrating a rotation control structure in a restricting configuration.
Figure 4:
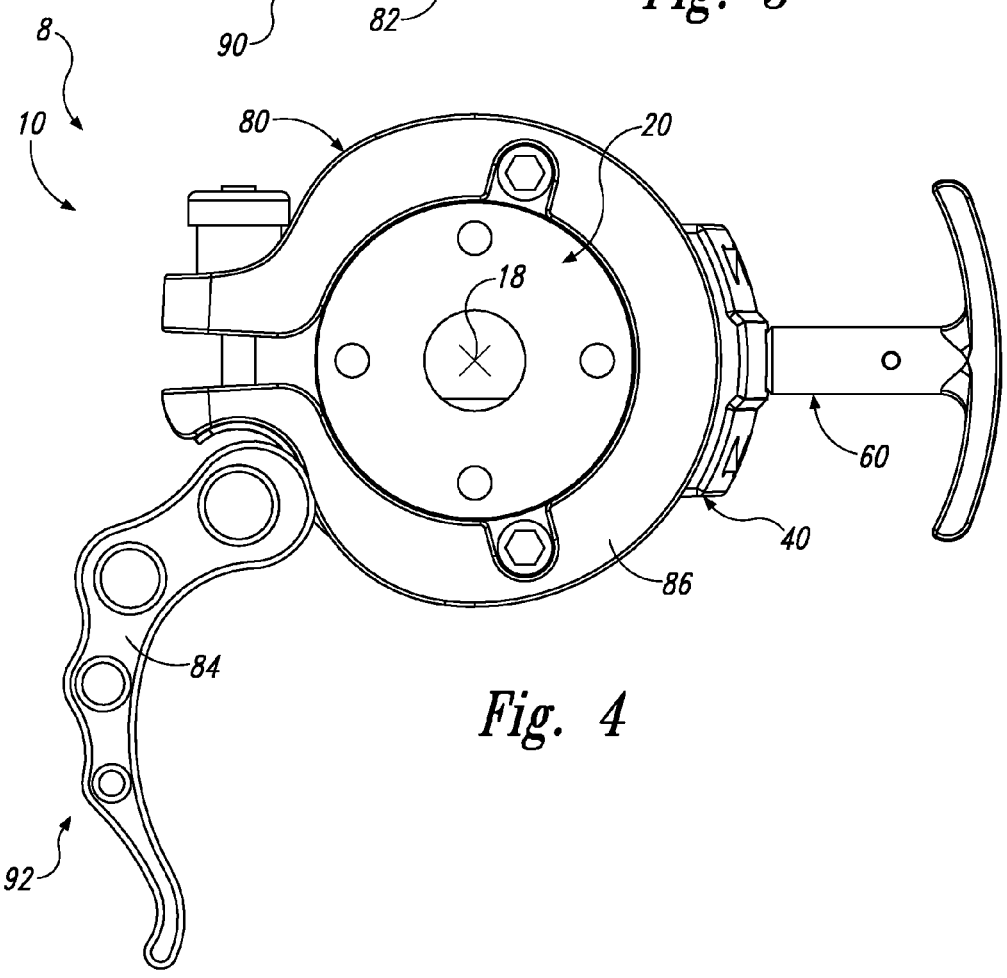
FIG. 4 is a top view of the electrical and physical mounting assembly of FIG. 2 illustrating the rotation control structure in a permitting configuration.
Figure 5:
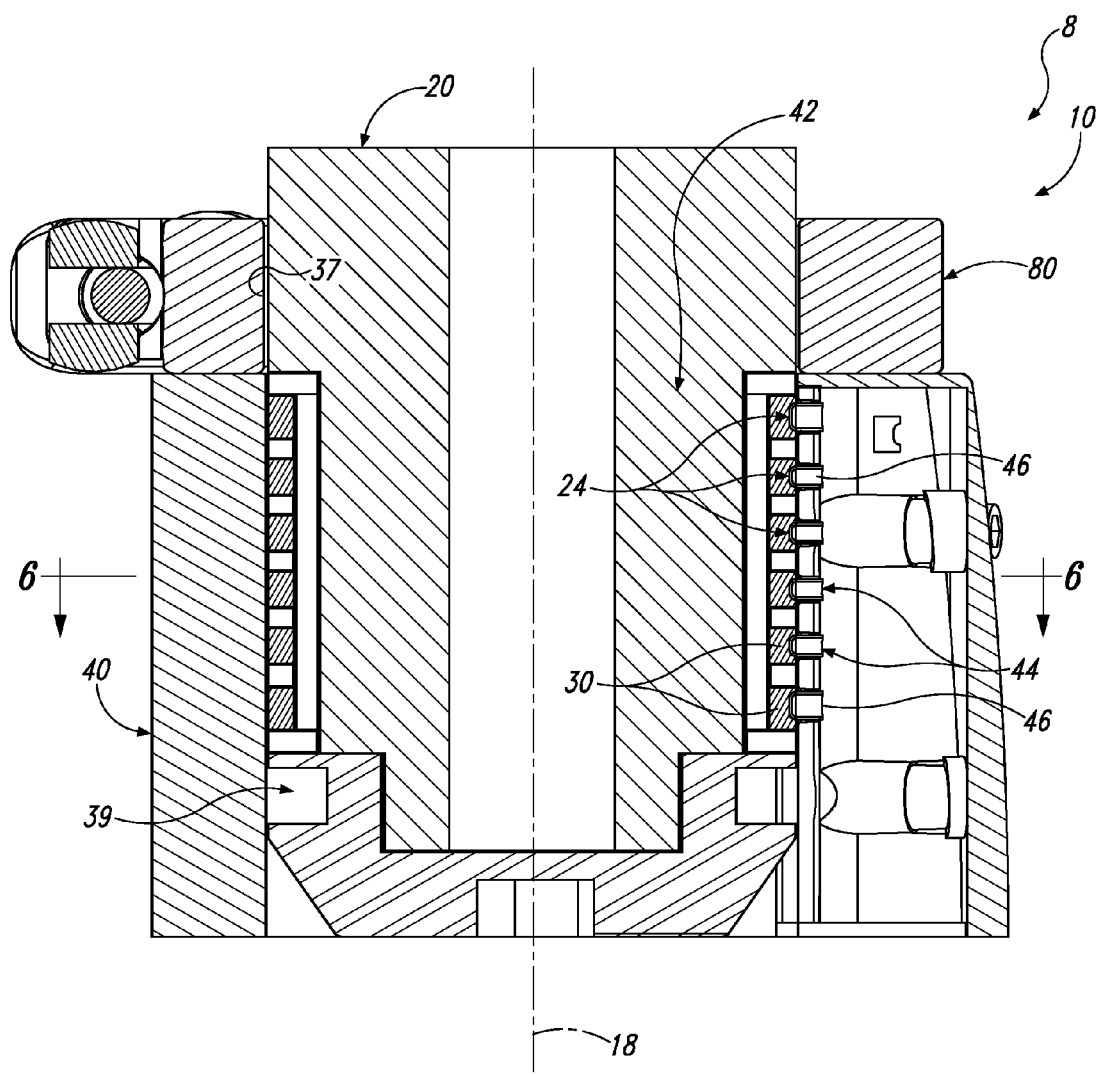
FIG. 5 is a cross-sectional view of the electrical and physical mounting assembly of FIG. 2 taken along line 5-5 of FIG. 3.
Figure 6:
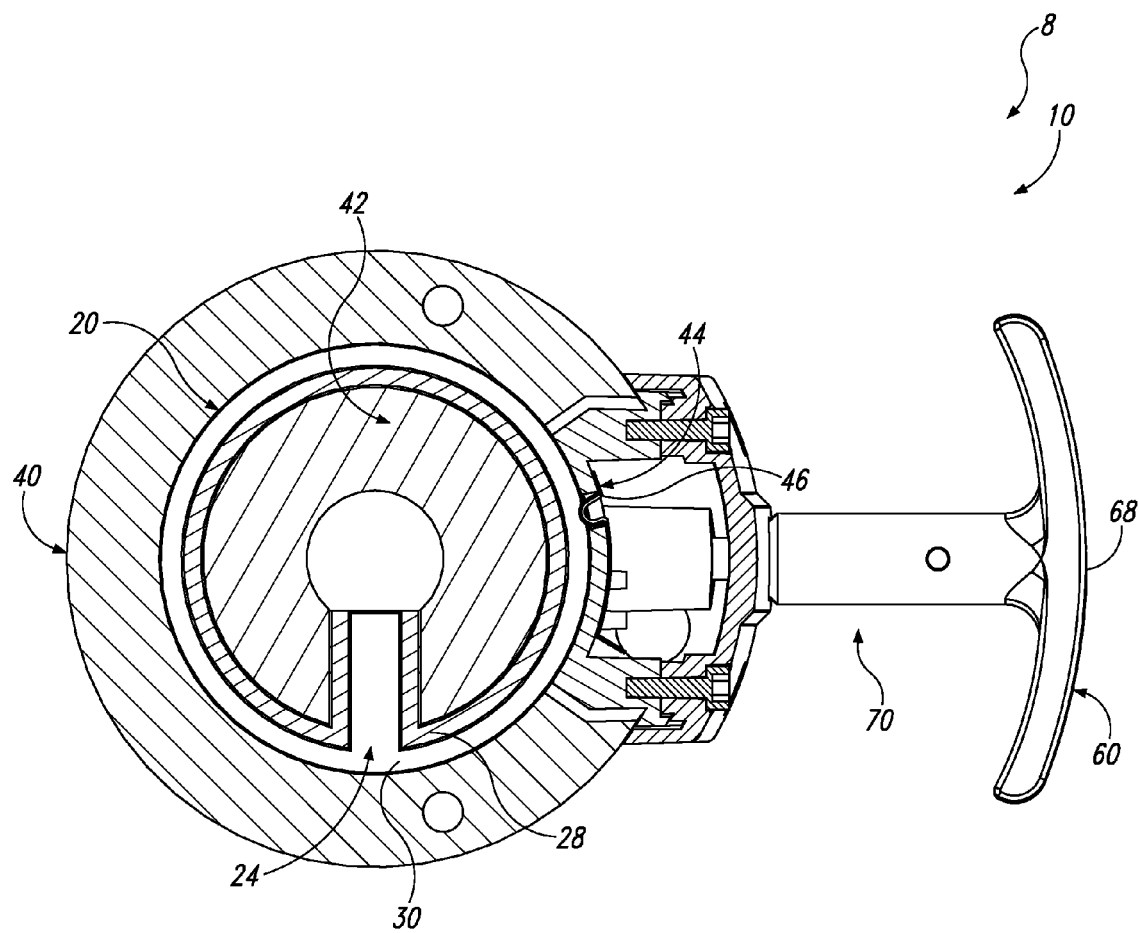
FIG. 6 is a cross-sectional view of the electrical and physical mounting assembly of FIG. 2 taken along line 6-6 of FIG. 5.

FIGS. 2-8 are less schematic views of an electrical and physical mounting assembly 10 according to the present disclosure. Mounting assembly 10 includes a male structure 20, which includes a plurality of first electrical contacts 24 (as illustrated in FIGS. 2 and 5-8), and a female structure 40, which includes a corresponding plurality of second electrical contacts 44 (as illustrated in FIGS. 2 and 5-6) and defines a receptacle 42 (as illustrated in FIGS. 2 and 5-8). Mounting assembly 10 also includes a retention structure 60 (as illustrated in FIGS. 2-4 and 7-8) and a rotation control structure 80 (as illustrated in FIGS. 2-5 and 7-8).

Figure 7:
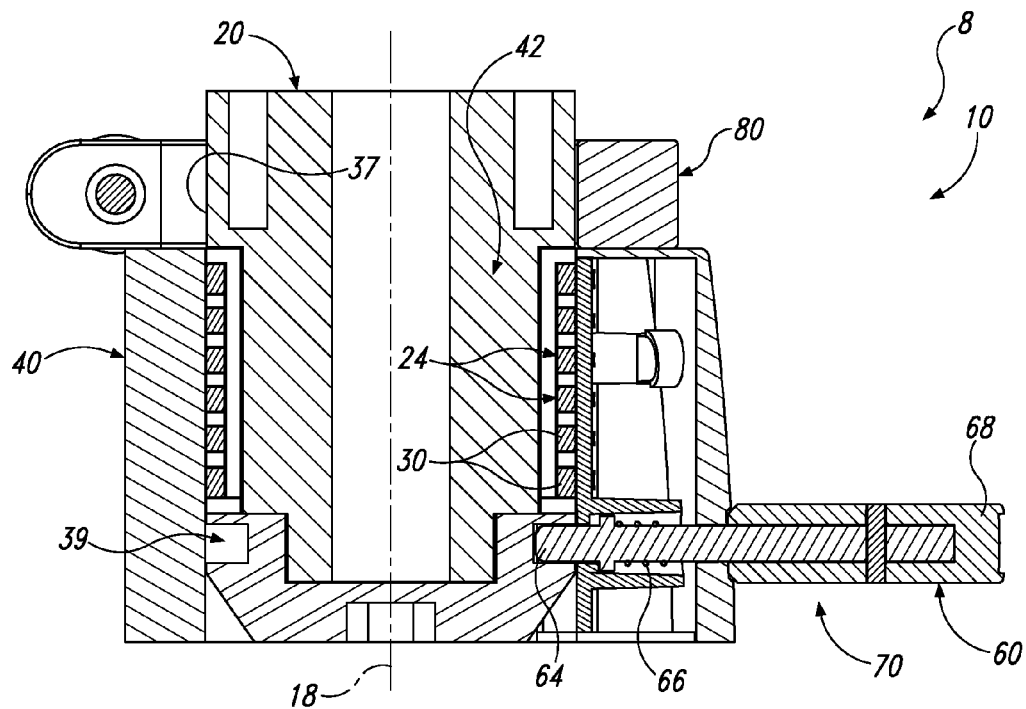
FIG. 7 is a cross-sectional view of the electrical and physical mounting assembly of FIG. 2 taken along line 7-7 of FIG. 3 and illustrating a retention structure in a retaining configuration.
Figure 8:
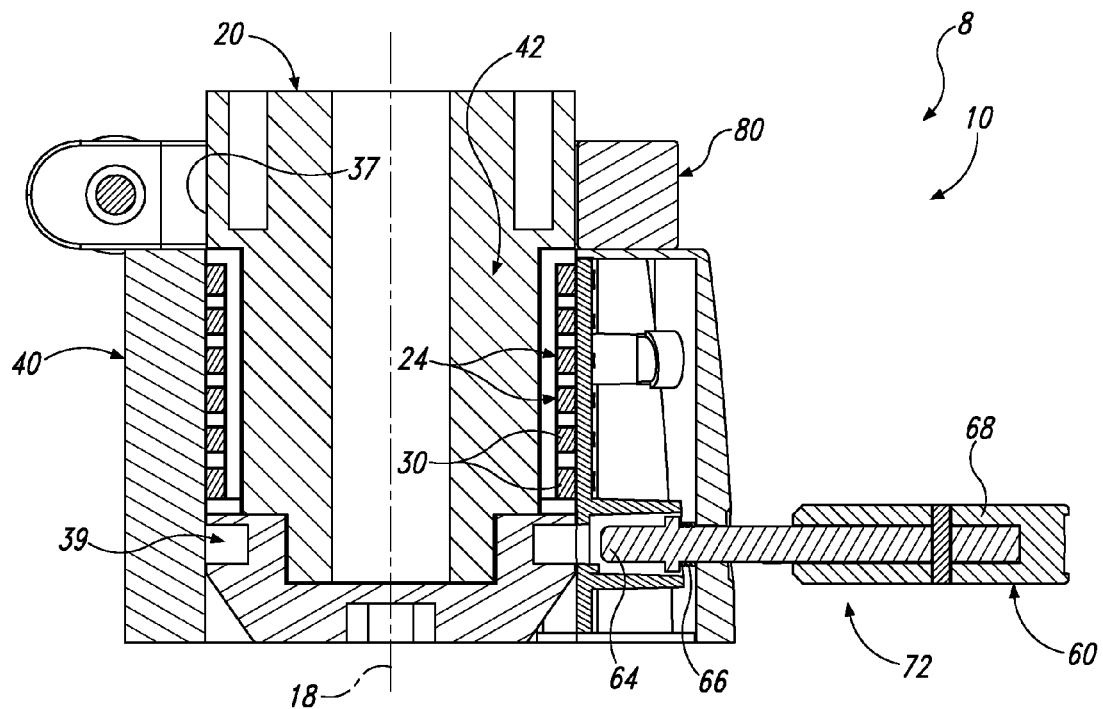
FIG. 8 is a cross-sectional view of the electrical and physical mounting assembly of FIG. 2 taken along line 7-7 of FIG. 3 and illustrating the retention structure in a released configuration.

FIG. 2 is a partially exploded view of mounting assembly 10 in which male structure 20 is illustrated as being separated and/or spaced apart from female structure 40. FIG. 3 is a top view of mounting assembly 10 in which male structure 20 is received within receptacle 42 and in which rotation control structure 80 is in a restricting configuration 90. FIG. 4 is a top view of mounting assembly 10 in which male structure 20 is received within receptacle 42 and in which rotation control structure 80 is in a permitting configuration 92. FIG. 5 is a cross-sectional view of mounting assembly 10 of FIG. 2 taken along line 5-5 of FIG. 3. FIG. 6 is a cross-sectional view of mounting assembly 10 of FIG. 2 taken along line 6-6 of FIG. 5. FIG. 7 is a cross-sectional view of mounting assembly 10 of FIG. 2 taken along line 7-7 of FIG. 3 and illustrating retention structure 60 in a retaining configuration 70. FIG. 8 is a cross-sectional view of mounting assembly 10 of FIG. 2 taken along line 7-7 of FIG. 3 and illustrating retention structure 60 in a released configuration 72.

As illustrated in FIGS. 2, 5 and 7-8, male structure 20 defines a clamping surface 37. Clamping surface 37 may form at least a portion of an outer surface 22 and is sized, located, shaped, and/or configured to operatively engage with rotation control structure 80 when male structure 20 is located within receptacle 42 and rotation control structure 80 is in restricting configuration 90 (as perhaps illustrated most clearly in FIG. 3). However, clamping surface 37 also is sized, located, shaped, and/or configured not to operatively engage with rotation control structure 80 when male structure 20 is located within receptacle 42 and rotation control structure 80 is in permitting configuration 92 (as perhaps illustrated most clearly in FIG. 4). Thus, mounting assembly 10 restricts rotation of male structure 20 and female structure 40 relative to one another about rotational axis 18 when rotation control structure 80 is in restricting configuration 90 but permits rotation of male structure 20 and female structure 40 relative to one another about rotational axis 18 when rotation control structure 80 is in permitting configuration 92.

As illustrated, rotation control structure 80 may be operatively attached to female structure 40. Thus, and when clamping surface 37 is operatively engaged with rotation control structure 80 (such as when the rotation control structure is in restricting configuration 90), the rotation control structure restricts the rotation of male structure 20 and female structure 40 relative to each other about rotational axis 18. In addition, the rotation control structure also may retain male structure 20 within receptacle 42 when the rotation control structure is in the restricting configuration.

As illustrated in FIGS. 2-4, rotation control structure 80 may include a lever 84 that may define a cam and is configured to transition (or facilitate a user in transitioning) the rotation control structure between restricting configuration 90 (as illustrated in FIGS. 2-3) and permitting configuration 92 (as illustrated in FIG. 4). A locking mechanism 82 may be configured to lock handle 84 such that the rotation control structure is retained in the restricting configuration. As discussed, the rotation control structure may be operatively affixed to the female structure and may be configured to selectively engage the male structure (or clamping surface 37 thereof) when the rotation control structure is in the restricting configuration. However, other configurations are also within the scope of the present disclosure.

As illustrated in FIGS. 2, 5, and 7-8, male structure 20 includes a retention recess 39 that extends around a circumference of, or circumferentially about, the male structure. In addition, and as illustrated in FIGS. 7-8, retention structure 60 may include a plunger 64 that may be configured to operatively engage both male structure 20 (such as retention structure 39 thereof) and female structure 40 when the retention structure is in retaining configuration 70. In addition, retention structure 60 also may include a biasing mechanism 66, such as a spring, which may be configured to bias the retention structure toward the retaining configuration, and a handle 68, which may be configured to transition (or facilitate a user in transitioning) the retention structure between retaining configuration 70 and released configuration 72.

As perhaps illustrated most clearly in FIG. 7, retention recess 39 is sized, located, shaped, and/or configured to receive a portion of retention structure 60 when male structure 20 is located within receptacle 42 and retention structure 60 is in retaining configuration 70. As illustrated, retention structure 60 may be operatively attached to and/or may extend through female structure 40. Thus, and when retention structure 60 is received within retention recess 39 (such as when the retention structure is in retaining configuration 70), the retention structure retains the male structure within the receptacle (i.e., restricts motion of male structure 20 and female structure 40 relative to one another in a direction that is parallel to rotational axis 18). However, the retention structure permits rotation of male structure 20 and female structure 40 relative to one another about rotational axis 18 (such as via circumferential translation of the retention structure within retention recess 39).

As perhaps illustrated most clearly in FIG. 8, when retention structure 60 is in released configuration 72, male structure 20 and female structure 40 may be free to translate relative to one another along rotational axis 18. As illustrated, when the retention structure is in the released configuration, the retention structure may not extend at least partially within retention recess 39 and/or may not restrict translation of male structure 20 and female structure 40 relative to one another along rotational axis 18. Thus, and when retention structure 60 is in released configuration 72, male structure 20 may be separated from female structure 40, such as via translation of the male structure and the female structure away from one another along rotational axis 18.

As illustrated in FIGS. 5-6, first electrical contacts 24 and second electrical contacts 44 may be located such that each first electrical contact is opposed to and/or in electrical communication with a corresponding second electrical contact when male structure 20 is received within receptacle 42. Thus, each first electrical contact may maintain electrical communication with the corresponding second electrical contact during rotation of male structure 20 and female structure 40 relative to each other about rotational axis 18. In the example of FIGS. 5-6, first electrical contact 24 includes an electrically conductive ring 30, while second electrical contact 44 includes a spring-loaded contact 46; however, other configurations also are within the scope of the present disclosure. As perhaps illustrated most clearly in FIG. 6, spring-loaded contact 46 may include and/or be an arcuate structure that may be biased to project at least partially into receptacle 42, thereby facilitating electrical communication with first electrical contact 24. Spring-loaded contact 46 may not be drawn to scale in FIG. 6. As an example, a thickness of spring-loaded contact 46 may be less than the thickness that is illustrated in FIG. 6. In addition, spring-loaded contact 46 may define any suitable shape that facilitates electrical communication with first electrical contact 24.

As illustrated in FIGS. 2-3, rotation control structure 80 may include a locking mechanism 82. Locking mechanism 82 may be configured to selectively retain rotation control structure 80 in restricting configuration 90. This may prevent unexpected and/or unauthorized rotation of male structure 20 and female structure 40 relative to each other and/or unexpected and/or unauthorized separation of the male structure and the female structure. As an example, locking mechanism 82 may selectively engage both lever 84 and a body 86 that defines a portion of rotation control structure 80. When locking mechanism 82 is selectively engaged with both lever 84 and body 86, lever 84 may be locked in restricting configuration 90 and/or may be unable to transition from restricting configuration 90 to permitting configuration 92. Examples of locking mechanism 82 include any suitable pin, screw, nut, bolt, key-lock, and/or combination-lock.

Figure 9:
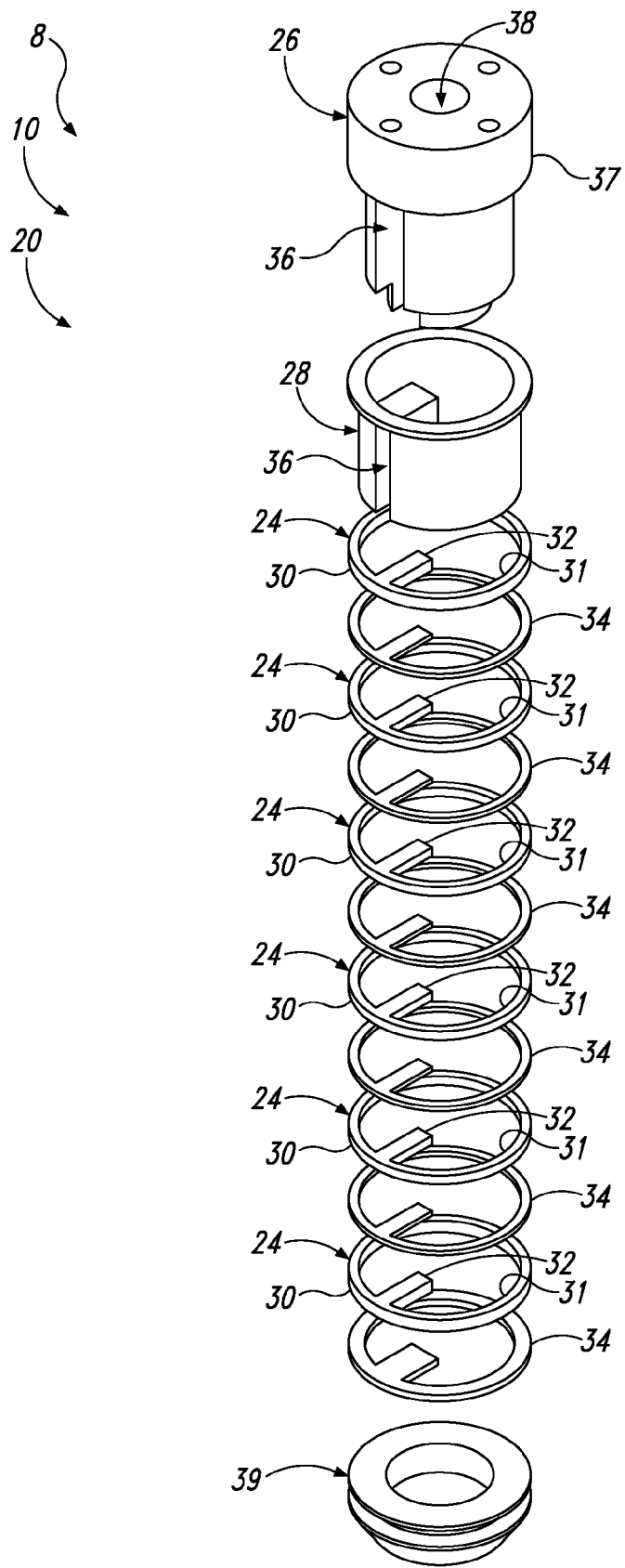
FIG. 9 is an exploded view of a male structure of the electrical and physical mounting assembly of FIG. 2.

FIG. 9 is an exploded view of male structure 20 of mounting assembly 10 of FIGS. 2-8. As illustrated, male structure 20 may include and/or be a composite male structure 20 that includes a plurality of separate and/or discrete components.

In FIG. 9, male structure 20 includes a core structure 26 and an insulating sleeve 28 that extends around at least a portion of the core structure. Male structure 20 further includes a plurality of first electrical contacts 24 in the form of a plurality of electrically conductive rings 30. The male structure also includes a plurality of insulating rings 34. The plurality of electrically conductive rings and the plurality of insulating rings extend around insulating sleeve 28, with a respective insulating ring extending between adjacent electrically conductive rings. Thus, the insulating rings may prevent electrical communication between the adjacent electrically conductive rings. Though illustrated as completely encircling the corresponding insulating sleeve or other surrounded structure, it is within the scope of the present disclosure that one or more, or even all, of the rings may extend around only a substantial (>80%) or a majority (>50%) portion of the corresponding insulating sleeve or other (partially) surrounded structure.

Each electrically conductive ring 30 defines an inner perimeter 31, and a tab 32 extends from the inner perimeter. Core structure 26 and/or insulating sleeve 28 may include a tab-receiving recess 36, which may be configured to receive tabs 32. Core structure 26 further may include central recess 38, and tabs 32 may extend from inner perimeter 31, through tab-receiving recess 36, and into central recess 38. This may permit electrical conductors (such as electrical conductors 17 of FIG. 1) that may extend within central recess 38 to electrically engage tabs 32.

As discussed, FIGS. 2-9 provide examples of mounting assemblies 10 and/or components thereof, and mounting assemblies 10 and/or components thereof may vary from the illustrated embodiments without departing from the scope of the present disclosure. As an example, electrically conductive rings 30 may form a portion of female structure 40, while spring-loaded contacts 46 may form a portion of male structure 20. As another example, electrically conductive rings 30 may not extend entirely around the outer circumference of male structure 20. As yet another example, electrically conductive rings 30 may include and/or be electrically conductive clips that clip onto male structure 20 and/or onto insulating sleeve 28 thereof. As another example, electrically conductive rings 30 may define a non-circular inner perimeter 31. As yet another example, insulating rings 34 may form a portion of insulating sleeve 28. As another example, insulating sleeve 28 may form a portion of core structure 26. As another example, male structure 20 and/or receptacle 42 may define a non-cylindrical shape. As yet another example, male structure 20 and/or receptacle 42 may define a conical shape and/or a truncated cone.

Figure 10:
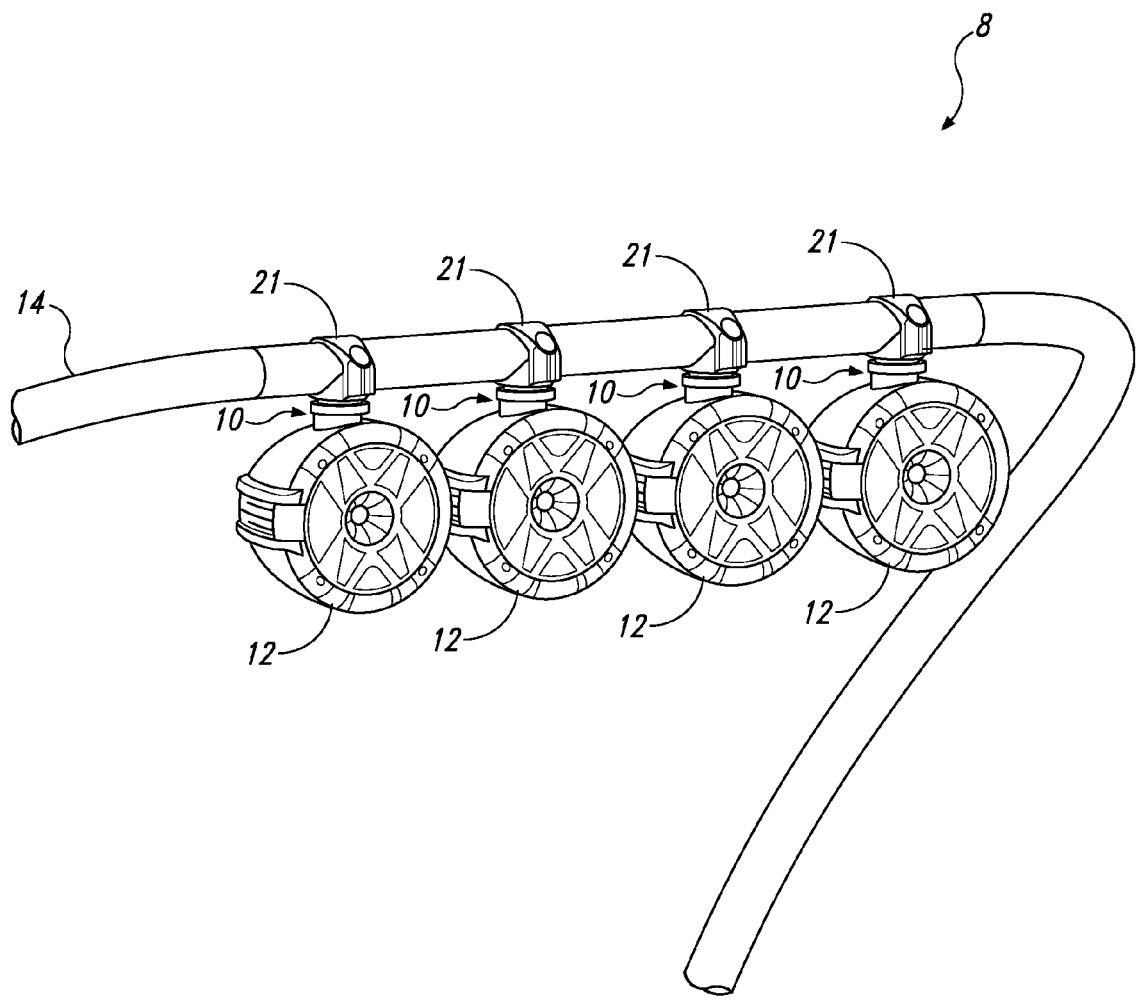
FIG. 10 is a fragmentary front view of a plurality of the electrical assemblies mounted to a base structure.

FIG. 10 illustrates an electrical assembly 8 that includes an electrical device 12, in the form of a lighted speaker, and an electrical and physical mounting assembly 10, according to the present disclosure, that operatively attaches the electrical device to a base structure 14. As illustrated in FIG. 10, a first mounting structure 21, in the form of a clamp, may be utilized to operatively attach electrical and physical mounting assembly 10 to base structure 14. As an example, and as illustrated, the first mounting structure may be utilized to operatively attach electrical assembly 8 to base structure 14 by clamping around and/or through the base structure. The base structure, in turn, may form a portion of, or be coupled to, a boat, off-road vehicle, or other land or marine vessel or vehicle.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, and/or embodiments according to the present disclosure, are intended to convey that the described component, feature, detail, structure, and/or embodiment is an illustrative, non-exclusive example of components, features, details, structures, and/or embodiments according to the present disclosure. Thus, the described component, feature, detail, structure, and/or embodiment is not intended to be limiting, required, or exclusive/exhaustive; and other components, features, details, structures, and/or embodiments, including structurally and/or functionally similar and/or equivalent components, features, details, structures, and/or embodiments, are also within the scope of the present disclosure.

Examples of mounting and electrical assemblies according to the present disclosure are presented in the following enumerated paragraphs.

A1. An electrical and physical mounting assembly configured to operatively mount an electrical device to a base structure and to conduct an electric current between the electrical device and the base structure, the mounting assembly comprising:
  a male structure having an outer surface, wherein the male structure includes a first electrical contact that defines at least a portion of the outer surface;
  a female structure that defines a receptacle sized to receive the male structure, wherein:
    the receptacle and the male structure are shaped to permit relative rotation therebetween about a rotational axis when the male structure is received within the receptacle;
    the female structure includes a second electrical contact that defines at least a portion of the receptacle; and
    the first electrical contact and the second electrical contact are shaped to maintain electrical communication therebetween during the relative rotation;
  a retention structure configured to selectively retain the male structure within the receptacle and to permit the relative rotation while the male structure is retained within the receptacle; and
  a rotation control structure configured to selectively restrict the relative rotation.

A2. The mounting assembly of paragraph A1, wherein the outer surface of the male structure defines a cylindrical region.

A2.1 The mounting assembly of paragraph A2, wherein the first electrical contact extends around a circumference of the cylindrical region.

A2.2 The mounting assembly of any of paragraphs A1-A2.1, wherein the receptacle is a cylindrical receptacle.

A2.2.1 The mounting assembly of paragraph A2.2, wherein the second electrical contact extends around a circumference of the cylindrical receptacle.

A3. The mounting assembly of any of paragraphs A1-A2.2.1, wherein the male structure is a composite male structure that includes a plurality of components.

A3.1 The mounting assembly of any of paragraphs A1-A3, wherein the male structure includes:
  a core structure;
  an insulating sleeve that extends around at least a portion of the core structure;
  a plurality of electrically conductive rings that extends around the insulating sleeve and comprise a plurality of first electrical contacts; and
  a plurality of insulating rings that extends around the insulating sleeve, wherein an insulating ring of the plurality of insulating rings extends between adjacent electrically conductive rings of the plurality of electrically conductive rings and prevents electrical communication between the adjacent electrically conductive rings.

A3.1.1 The mounting assembly of paragraph A3.1, wherein each of the plurality of electrically conductive rings defines an inner perimeter and includes a tab that extends from the inner perimeter.

A3.1.1.1 The mounting assembly of paragraph A3.1.1, wherein the core structure includes a tab-receiving recess configured to receive the tab.

A3.1.1.2 The mounting assembly of any of paragraphs A3.1.1-A3.1.1.1, wherein the core structure includes a central recess that extends parallel to the rotational axis, and further wherein the tab extends within the central recess.

A3.2 The mounting assembly of any of paragraphs A1-A3.1.1.2, wherein the male structure defines a retention recess sized to receive the retention structure.

A3.2.1 The mounting assembly of paragraph A3.2, wherein the retention recess extends around an outer perimeter of the male structure.

A3.3 The mounting assembly of any of paragraphs A1-A3.2.1, wherein the male structure defines a clamping surface that forms a portion of the outer surface and is configured to operatively engage with the rotation control structure to selectively restrict the relative rotation.

A4. The mounting assembly of any of paragraphs A1-A3.3, wherein the female structure is a composite female structure that includes a plurality of components.

A4.1 The mounting assembly of any of paragraphs A1-A4, wherein the female structure includes a plurality of spring-loaded contacts that comprise a plurality of second electrical contacts.

A4.1.1 The mounting assembly of paragraph A4.1, wherein each of the plurality of spring-loaded contacts is located to remain in electrical communication with a respective one of a/the plurality of electrically conductive rings of the male structure during the relative rotation.

A4.1.2 The mounting assembly of any of paragraphs A4.1-A4.1.1, wherein each of the plurality of spring-loaded contacts projects into the receptacle.

A4.1.3 The mounting assembly of any of paragraphs A4.1-A4.1.2, wherein each of the plurality of spring-loaded contacts is biased to engage a respective one of a/the plurality of first electrical contacts.

A5. The mounting assembly of any of paragraphs A1-A4.1.3, wherein one of the first electrical contact and the second electrical contact includes an electrically conductive ring, and further wherein the other of the first electrical contact and the second electrical contact includes a spring-loaded contact.

A6. The mounting assembly of any of paragraphs A1-A5, wherein the male structure includes a/the plurality of first electrical contacts, wherein the female structure includes a/the plurality of second electrical contacts, and further wherein each of the plurality of first electrical contacts maintains electrical communication with a corresponding one of the plurality of second electrical contacts during the relative rotation.

A6.1 The mounting assembly of paragraph A6, wherein the plurality of first electrical contacts includes at least 2, at least 3, at least 4, at least 5, at least 6, at least 7, at least 8, at least 9, or at least 10 first electrical contacts.

A6.2 The mounting assembly of any of paragraphs A6-A6.1, wherein the plurality of second electrical contacts includes at least 2, at least 3, at least 4, at least 5, at least 6, at least 7, at least 8, at least 9, or at least 10 second electrical contacts.

A6.3 The mounting assembly of any of paragraphs A6-A6.2, wherein the plurality of first electrical contacts includes at least a first speaker power contact, at least a first light power contact, and at least a first ground contact, optionally wherein the at least a first ground contact includes a first speaker ground contact and a first light ground contact that is separate from the first speaker ground contact.

A6.4 The mounting assembly of any of paragraphs A6-A6.3, wherein the plurality of second electrical contacts includes at least a second speaker power contact, at least a second light power contact, and at least a second ground contact, optionally wherein the at least a second ground contact includes a second speaker ground contact and a second light ground contact that is separate from the second speaker ground contact.

A7. The mounting assembly of any of paragraphs A1-A6.4, wherein the relative rotation includes relative rotation of at least 90 degrees, at least 180 degrees, at least 270 degrees, at least 360 degrees, or more than 360 degrees.

A8. The mounting assembly of any of paragraphs A1-A7, wherein the retention structure defines at least a retaining configuration, in which the retention structure retains the male structure within the receptacle, and a released configuration, in which the retention structure does not retain the male structure within the receptacle.

A8.1 The mounting assembly of paragraph A8, wherein the retention structure includes a handle configured to transition the retention structure between the retaining configuration and the released configuration.

A8.2 The mounting assembly of any of paragraphs A8-A8.1, wherein the retention structure includes a retention structure biasing mechanism configured to bias the retention structure toward the retaining configuration.

A8.3 The mounting assembly of any of paragraphs A8-A8.2, wherein the retention structure includes a plunger configured to operatively engage both the male structure and the female structure when the retention structure is in the retaining configuration.

A8.3.1 The mounting assembly of paragraph A8.3, wherein, when the retention structure is in the retaining configuration, the plunger is received within the retention recess defined by the male structure.

A8.4 The mounting assembly of any of paragraphs A8-A8.3.1, wherein the retention structure is operatively affixed to the female structure and selectively engages the male structure when the male structure is received within the receptacle and the retention structure is in the retaining configuration.

A8.4.1 The mounting assembly of any of paragraphs A8-A8.4, wherein the retention structure further includes a retention structure lock configured to selectively retain the retention structure in the retaining configuration.

A8.4.2 The mounting assembly of paragraph A8.4.1, wherein the retention structure lock includes at least one of a screw, a bolt, a pin, a nut, a combination-receiving lock, and a keyed lock.

A9. The mounting assembly of any of paragraphs A1-A8.4.2, wherein the rotation control structure defines at least a restricting configuration, in which the rotation control structure restricts the relative rotation, and a permitting configuration, in which the rotation control structure permits the relative rotation.

A9.1 The mounting assembly of paragraph A9, wherein the rotation control structure includes a lever configured to transition the rotation control structure between the restricting configuration and the permitting configuration.

A9.2 The mounting assembly of any of paragraphs A9-A9.1, wherein the rotation control structure includes a locking mechanism configured to selectively retain the rotation control structure in the restricting configuration.

A9.2.1 The mounting assembly of paragraph A9.2, wherein the locking mechanism includes at least one of a screw, a bolt, a pin, a nut, a combination-receiving lock, and a keyed lock.

A9.3 The mounting assembly of any of paragraphs A9-A9.2.1, wherein the rotation control structure is configured to operatively engage both the male structure and the female structure when the rotation control structure is in the restricting configuration.

A9.4 The mounting assembly of any of paragraphs A9-A9.3, wherein, when in the restricting configuration, the rotation control structure operatively engages the clamping surface defined by the male structure.

A9.5 The mounting assembly of any of paragraphs A9-A9.4, wherein the rotation control structure retains the male structure within the receptacle when the rotation control structure is in the restricting configuration.

A9.6 The mounting assembly of any of paragraphs A9-A9.5, wherein the rotation control structure is operatively affixed to the female structure and selectively engages the male structure when the male structure is received within the receptacle and the rotation control structure is in the restricting configuration.

A10. The mounting assembly of any of paragraphs A1-A9.6, wherein the male structure is received within the receptacle.

A10.1 The mounting assembly of paragraph A10, wherein the first electrical contact is in electrical communication with the second electrical contact.

A10.2 The mounting assembly of any of paragraphs A10-A10.1, wherein the retention structure operatively retains the male structure within the receptacle.

A10.3 The mounting assembly of any of paragraphs A10-A10.2, wherein the retention structure permits the relative rotation.

A10.4 The mounting assembly of any of paragraphs A10-A10.3, wherein the rotation control structure restricts the relative rotation.

A10.5 The mounting assembly of any of paragraphs A10-A10.4, wherein the rotation control structure permits the relative rotation.

A11. The mounting assembly of any of paragraphs A1-A10.5, wherein the male structure includes a first mounting structure configured to operatively affix the male structure to one of the electrical device and the base structure.

A11.1 The mounting assembly of paragraph A11, wherein the female structure includes a second mounting structure configured to operatively affix the female structure to the other of the electrical device and the base structure.

B1. An electrical assembly, comprising:
an electrical device; and
the mounting assembly of any of paragraphs A1-A11.1, wherein:
the electrical device at least one of (i) is operatively affixed to a selected one of the male structure and the female structure and (ii) defines a/the selected one of the male structure and the female structure; and
a first electrical conductor extends between the electrical device and the selected one of the male structure and the female structure to conduct an electric current between the electrical device and the other of the male structure and the female structure via the first electrical contact and the second electrical contact.

B2. The electrical assembly of paragraph B1, wherein the mounting assembly includes a plurality of first electrical contacts, a corresponding plurality of second electrical contacts, and a corresponding plurality of first electrical conductors, wherein each of the plurality of first electrical conductors extends between the electrical device and the selected one of the male structure and the female structure to conduct a respective electric current between the electrical device and the other of the male structure and the female structure via a respective one of the plurality of first electrical contacts and a respective one of the plurality of second electrical contacts.

B2.1 The electrical assembly of paragraph B2, wherein the mounting assembly further includes a plurality of second electrical conductors, wherein each of the plurality of second electrical conductors extends between the base structure and the other of the male structure and the female structure to conduct a respective electric current between the base structure and the electrical device via a respective one of the plurality of first electrical contacts, a respective one of the plurality of second electrical contacts, and a respective one of the plurality of first electrical conductors.

B2.2 The electrical assembly of paragraph B2, wherein the plurality of first electrical contacts, the plurality of second electrical contacts, and/or the plurality of first electrical conductors includes at least 3, at least 4, at least 5, at least 6, at least 7, at least 8, at least 9, or at least 10 first electrical contacts, second electrical contacts, and/or first electrical conductors.

B3. The electrical assembly of any of paragraphs B1-B2.2, wherein the electrical device includes at least one of a speaker, a light, a spotlight, a floodlight, and a speaker with lights.

B4. The electrical assembly of any of paragraphs B1-B3, wherein the electrical assembly further includes the base structure.

B4.1 The electrical assembly of paragraph B4, wherein the base structure at least one of (i) is operatively affixed to the other of the male structure and the female structure and (ii) defines the other of the male structure and the female structure.

B4.2 The electrical assembly of any of paragraphs B4-B4.1, wherein the electrical assembly further includes a second electrical conductor that extends between the base structure and the other of the male structure and the female structure to conduct the electric current between the base structure and the electrical device via the first electrical contact, the second electrical contact, and the first electrical conductor.

B5. The electrical assembly of any of paragraphs B4-B4.2, wherein the base structure further includes a power source configured to provide the electric current, optionally wherein the power source includes at least one of a battery, an alternator, a generator, and an amplifier.

B6. The electrical assembly of any of paragraphs B4-B5, wherein the base structure includes at least one of a tower, a light bar, a speaker bar, a utility rack, a roll bar, and a boat rail.

B7. The electrical assembly of any of paragraphs B4-B6, wherein the base structure is operatively attached to at least one of a vehicle, a boat, a vessel, an automobile, an off-road vehicle, and an ATV.

B8. The electrical assembly of any of paragraphs B4-B5, wherein the base structure includes at least one of a vehicle, a boat, a vessel, an automobile, an off-road vehicle, and an ATV.

B9. A vehicle including the mounting assembly of any of paragraphs A1-A11.1 or the electrical assembly of any of paragraphs B1-B7.

B10. A vessel including the mounting assembly of any of paragraphs A1-A11.1 or the electrical assembly of any of paragraphs B1-B7.

INDUSTRIAL APPLICABILITY

The systems disclosed herein are applicable to the electrical device and outdoor vehicle industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. An electrical and physical mounting assembly configured to operatively mount a lighted speaker, which includes a light and a speaker, to a vehicle and to conduct a plurality of electric currents between the lighted speaker and the vehicle, wherein the plurality of electric currents includes at least a speaker power electric current, which is provided to the speaker, and a light power electric current, which is provided to the light, the mounting assembly comprising:

a male structure having an outer surface, wherein the male structure includes:
(i) a first speaker power contact that defines at least a portion of the outer surface;
(ii) a first light power contact that defines at least a portion of the outer surface; and
(iii) a first ground contact that defines at least a portion of the outer surface;

a female structure that defines a receptacle sized to receive the male structure, wherein the receptacle and the male structure are shaped to permit relative rotation therebetween about a rotational axis when the male structure is received within the receptacle, and further wherein the female structure includes:
  (i) a second speaker power contact that defines at least a portion of the receptacle, wherein the first speaker power contact and the second speaker power contact are shaped to maintain electrical communication therebetween during the relative rotation;
  (ii) a second light power contact that defines at least a portion of the receptacle, wherein the first light power contact and the second light power contact are shaped to maintain electrical communication therebetween during the relative rotation; and
  (iii) a second ground contact that defines at least a portion of the receptacle, wherein the first ground contact and the second ground contact are shaped to maintain electrical communication therebetween during the relative rotation;
a retention structure configured to selectively retain the male structure within the receptacle and to permit the relative rotation while the male structure is retained within the receptacle; and
a rotation control structure configured to selectively restrict the relative rotation.

2. The mounting assembly of claim 1, wherein the rotation control structure defines at least a restricting configuration, in which the rotation control structure restricts the relative rotation, and a permitting configuration, in which the rotation control structure permits the relative rotation.

3. The mounting assembly of claim 2, wherein the rotation control structure is configured to operatively engage both the male structure and the female structure when the rotation control structure is in the restricting configuration.

4. The mounting assembly of claim 2, wherein the male structure defines a clamping surface that forms a portion of the outer surface and is configured to operatively engage with the rotation control structure when the rotation control structure is in the restricting configuration.

5. The mounting assembly of claim 2, wherein the rotation control structure is operatively affixed to the female structure and selectively engages the male structure when the male structure is received within the receptacle and the rotation control structure is in the restricting configuration.

6. The mounting assembly of claim 1, wherein the retention structure defines at least a retaining configuration, in which the retention structure retains the male structure within the receptacle, and a released configuration, in which the retention structure does not retain the male structure within the receptacle.

7. The mounting assembly of claim 6, wherein the male structure defines a retention recess sized to receive the retention structure.

8. The mounting assembly of claim 7, wherein the retention recess extends around an outer perimeter of the male structure.

9. The mounting assembly of claim 6, wherein the retention structure includes a plunger configured to operatively engage both the male structure and the female structure when the retention structure is in the retaining configuration.

10. The mounting assembly of claim 6, wherein the retention structure is operatively affixed to the female structure and selectively engages the male structure when the male structure is received within the receptacle and the retention structure is in the retaining configuration.

11. The mounting assembly of claim 1, wherein the outer surface of the male structure defines a cylindrical region, and further wherein the first speaker power contact, the first light power contact, and the first ground contact each extend around a circumference of the cylindrical receptacle.

12. The mounting assembly of claim 1, wherein the receptacle is a cylindrical receptacle, and further wherein the second speaker power contact, the second light power contact, and the second ground contact each extend around a circumference of the cylindrical receptacle.

13. The mounting assembly of claim 1, wherein the relative rotation includes relative rotation of more than 360 degrees.

14. The mounting assembly of claim 1, wherein the male structure includes:
  a core structure;
  an insulating sleeve that extends around at least a portion of the core structure;
  a plurality of electrically conductive rings that extends around the insulating sleeve and comprises the first speaker power contact, the first light power contact, and the first ground contact; and
  a plurality of insulating rings that extends around the insulating sleeve, wherein an insulating ring of the plurality of insulating rings extends between adjacent electrically conductive rings of the plurality of electrically conductive rings and prevents electrical communication between the adjacent electrically conductive rings.

15. The mounting assembly of claim 1, wherein the female structure includes a plurality of spring-loaded contacts that comprises the second speaker power contact, the second light power contact, and the second ground contact.

16. The mounting assembly of claim 1, wherein:
  (i) the first ground contact includes a first speaker ground contact and a first light ground contact that is separate from the first speaker ground contact;
  (ii) the second ground contact includes a second speaker ground contact and a second light ground contact that is separate from the second speaker ground contact;
  (iii) the first speaker ground contact and the second speaker ground contact together are configured to receive the speaker power electric current from the speaker; and
  (iv) the first light ground contact and the second light ground contact together are configured to receive the light power electric current from the light.

17. An electrical assembly, comprising:
the mounting assembly of claim 1; and
the lighted speaker, wherein the lighted speaker at least one of (i) is operatively affixed to a selected one of the male structure and the female structure and (ii) defines the selected one of the male structure and the female structure.

18. An electrical and physical mounting assembly configured to operatively mount an electrical device to a base structure and to conduct an electric current between the electrical device and the base structure, the mounting assembly comprising:
a male structure having an outer surface, wherein the male structure:
  (i) includes a first electrical contact that defines at least a portion of the outer surface; and
  (ii) defines a clamping surface that forms at least a portion of the outer surface;
a female structure that defines a receptacle sized to receive the male structure, wherein:
  (i) the receptacle and the male structure are shaped to permit relative rotation therebetween about a rotational axis when the male structure is received within the receptacle;
  (ii) the female structure includes a second electrical contact that defines at least a portion of the receptacle; and (iii) the first electrical contact and the second electrical contact are shaped to maintain electrical communication therebetween during the relative rotation;

a retention structure configured to selectively retain the male structure within the receptacle and to permit the relative rotation while the male structure is retained within the receptacle; and a rotation control structure configured to selectively restrict the relative rotation, wherein the rotation control structure defines at least a restricting configuration, in which the rotation control structure restricts the relative rotation, and a permitting configuration, in which the rotation control structure permits the relative rotation, and further wherein the rotation control structure is configured to operatively engage the clamping surface when the rotation control structure is in the restricting configuration.

19. The mounting assembly of claim 18, wherein the retention structure defines at least a retaining configuration, in which the retention structure retains the male structure within the receptacle, and a released configuration, in which the retention structure does not retain the male structure within the receptacle, wherein the male structure further defines a retention recess sized to receive at least a portion of the retention structure, and further wherein the retention structure includes a plunger that is configured to be received within the retention recess when the retention structure is in the retaining configuration.

20. An electrical and physical mounting assembly configured to operatively mount an electrical device to a base structure and to conduct an electric current between the electrical device and the base structure, the mounting assembly comprising:

a male structure having an outer surface, wherein the male structure:
(i) includes a first electrical contact that defines at least a portion of the outer surface; and
(ii) defines a retention recess that extends circumferentially about the male structure;

a female structure that defines a receptacle sized to receive the male structure, wherein:
(i) the receptacle and the male structure are shaped to permit relative rotation therebetween about a rotational axis when the male structure is received within the receptacle;
(ii) the female structure includes a second electrical contact that defines at least a portion of the receptacle; and
(iii) the first electrical contact and the second electrical contact are shaped to maintain electrical communication therebetween during the relative rotation;

a retention structure configured to selectively retain the male structure within the receptacle and to permit the relative rotation while the male structure is retained within the receptacle, wherein the retention structure defines at least a retaining configuration, in which the retention structure retains the male structure within the receptacle, and a released configuration, in which the retention structure does not retain the male structure within the receptacle, the retention recess is sized to receive at least a portion of the retention structure, and further wherein the retention structure includes a plunger that is configured to be received within the retention recess when the retention structure is in the retaining configuration; and a rotation control structure configured to selectively restrict the relative rotation.

\* \* \* \* \*